US008984427B2

(12) United States Patent
Hayner et al.

(10) Patent No.: US 8,984,427 B2
(45) Date of Patent: Mar. 17, 2015

(54) SYSTEM AND METHOD FOR CAPTURING ANALYZING AND RECORDING SCREEN EVENTS

(75) Inventors: Omri Hayner, Kfar Hogla (IL); Itay Grushka, Shoham (IL)

(73) Assignee: Nice-Systems Ltd., Ra'anana (IL)

( * ) Notice: Subject to any disclaimer, the term of this patent is extended or adjusted under 35 U.S.C. 154(b) by 647 days.

(21) Appl. No.: 12/982,681

(22) Filed: Dec. 30, 2010

(65) Prior Publication Data

US 2011/0099182 A1  Apr. 28, 2011

Related U.S. Application Data

(63) Continuation of application No. 10/469,550, filed as application No. PCT/IL02/00197 on Mar. 12, 2002.

(60) Provisional application No. 60/274,658, filed on Mar. 12, 2001.

(51) Int. Cl.
*G06F 3/048* (2013.01)
*G06F 11/34* (2006.01)
*G06F 3/01* (2006.01)

(52) U.S. Cl.
CPC ............ *G06F 11/3409* (2013.01); *G06F 3/048* (2013.01); *G06F 11/3438* (2013.01); *G06F 11/3476* (2013.01); *G06F 2201/80* (2013.01); *G06F 2201/86* (2013.01); *G06F 2201/875* (2013.01)
USPC ........................................ 715/764; 709/229

(58) Field of Classification Search
CPC ............ G06F 3/0484; G06F 17/30867; G06F 17/30011; G06F 17/30017
USPC .......................................... 715/764; 709/229
See application file for complete search history.

(56) References Cited

U.S. PATENT DOCUMENTS

| | | | | |
|---|---|---|---|---|
| 5,535,256 A | * | 7/1996 | Maloney et al. | 379/309 |
| 5,726,914 A | * | 3/1998 | Janovski et al. | 702/84 |
| 5,790,798 A | * | 8/1998 | Beckett et al. | 709/224 |
| 6,047,261 A | * | 4/2000 | Siefert | 705/7.38 |
| 6,185,514 B1 | * | 2/2001 | Skinner et al. | 702/188 |
| 6,324,282 B1 | * | 11/2001 | McIllwaine et al. | 379/265.06 |
| 6,389,472 B1 | * | 5/2002 | Hughes et al. | 709/229 |

* cited by examiner

*Primary Examiner* — Nicholas Augustine
(74) *Attorney, Agent, or Firm* — Pearl Cohen Zedek Latzer Baratz LLP

(57) ABSTRACT

A computer-implemented method for assessing the quality of performance of agents engaged in customer-representative interaction-related sessions is provided. The method includes capturing screen events of a computational representative to form a captured event, wherein the screen event is a graphical user interface (GUI) element shown on a screen coupled to the computational device; parsing the captured event according to one or more criteria to obtain screen event data that contains text; triggering recording of screen data associated with the computational device, if the screen event data matches a user defined text search criterion; and performing computer-based automated quality measurement analysis based on the screen event data.

14 Claims, 6 Drawing Sheets

SYSTEM AND METHOD FOR CAPTURING ANALYZING AND RECORDING SCREEN EVENTS

CROSS-REFERENCE TO RELATED APPLICATIONS

This application is a Continuation application of U.S. patent application Ser. No. 10/469,550, filed Sep. 11, 2003, which in turn is a National Phase application of PCT Patent application No. PCT/IL2002/00197, International Filing date Mar. 12, 2002, which in turn claims priority from U.S. Provisional application No. 60/274,658 filed Mar. 12, 2001, each of which are incorporated in its entirety by reference herein.

FIELD OF THE INVENTION

The present invention is of a method and system for capturing, analyzing and recording screen events, and in particular, for such a system and method in which the screen events are decomposed into one or more components for enabling filtering and/or analysis of the components.

BACKGROUND OF THE INVENTION

The level of service provided by a company to its customers has an increasing effect on the loyalty of customers to the company's products and the value of its brand name. A considerable segment of the interaction of a customer with a company may be through that company's call/contact center. These centers provide services to the customer through customer service representatives, who are the personnel of the centers in direct contact with the customer. The potential impact of this experience on customer loyalty to a company makes it imperative that the service provided by a customer service representative is the best possible and that customer service representatives are familiar with the services and/or products of the company, and also with the goals of that company.

During sessions with customers, while conversing on the phone, chatting on the Web and/or through other types of "chat" or instant messaging systems, answering an e-mail message or any other form of communication with the customer, a customer service representative is expected to demonstrate a certain level of service, familiarity with the underlying software systems of the company, courtesy to the customer and various other attributes. The quality of the performance by the customer service representative is therefore quite important, in order to provide high quality customer service and thereby generate customer loyalty. Thus, the accurate assessment of the quality of this performance is quite important.

Certain methodologies for quality measurement (QM) of customer service representative performance on the job have evolved. Most of these methodologies use automatic tools for recording and playback of customer sessions, occasionally with synchronized recording of the activities on the screen or monitor of the computer of the customer service representative during the interaction. Capturing and playback of screen activities enables evaluation of the customer service representative's abilities with regard to operation of software applications used by the company to manage the relevant processes, such as a CRM (customer relations management) system, e-mail message system and so forth. The ability of the customer service representative to properly operate these systems both with regard to the functional aspect (the ability to type quickly and accurately, and the familiarity with the various screens relevant to the task), and also with regard to the ability to accomplish one or more customer-related goals which may occur as a result of an interaction.

Currently, various QM systems conduct recording of screen shots at varying degrees of frequency on the customer service representative's desktop screen. These screen shots are a collection of bitmaps and are either synchronized with applicable telephone interactions or can be viewed standalone.

Currently available technologies for attempting to assess the quality of interactions of customer service representatives with the customer have a number of drawbacks. For example, these technologies may cause network congestion, as the type of information transmitted requires excessive use of the network bandwidth and can affect the performance of highly important applications on the network, if a heavy implementation of the software program is used. Furthermore, for those workstations which are connected to the network by a modem or other low bandwidth devices, screen recording is currently not a realistic or practical option.

Another drawback of currently available technologies is their potentially excessive consumption of workstation (computer) resources. Certain of the workstation resources are dedicated to performing the screen recording and may slow down the performance of the workstation for the customer service representative, hence hampering the ability of that representative to perform the work.

In addition, these technologies do not provide actual data, as the screen shots by themselves are not susceptible to automatic analysis and can only be understood by a human supervisor with a high level of familiarity with the subject matter. Such manual analysis of the screenshots is clearly inefficient and time consuming.

SUMMARY OF EMBODIMENTS OF THE INVENTION

The background art does not teach or suggest a method or system for capturing screen events in a data format which is susceptible to further filtering and/or analysis. The background art also does not teach or suggest a method or system for decomposing the captured screen events into one or more components, which may then optionally be filtered and/or analyzed. Furthermore, the background art does not teach or suggest a method or system for capturing and storing content related to the decomposed screen events.

The present invention overcomes these deficiencies of the background art by providing a system and method for capturing screen events, and processing these events to form data in a data format which is susceptible to analysis. Preferably, the method also comprises analyzing the data in order to extract useful information about the user of the screen and computational device which generated these screen events. More preferably, the method of the present invention is able to assess the quality of the performance of the user whose interaction with the computational device caused the screen events to be generated.

As used herein, the term "screen event" may be understood to also include any computational device environment event. Examples of computational device environment events include but are not limited to, actions by the user with regard to the operation of the mouse or other pointing device, or with regard to the operation of the keyboard, or any type of event occurring on the screen of the computational device, or any other type of data which is related to or integrated with at least one activity on the screen of the computational device of the user. Such an activity could optionally be an action performed on the screen, an action which changes or otherwise alters some aspect of the display of the screen, and/or any type of display by the screen.

A screen event may optionally have content associated with the event, which may optionally and more preferably also be captured with the screen event itself. Examples of such content include, but are not limited to, any type of multimedia data or multimedia interaction, such as video and audio data, VoIP (Voice over IP) data, chat, documents, e-mail messages and so forth. For example, in order to be able to retain an e-mail message, the system of the present invention may optionally be integrated with an e-mail server, which sends and receives e-mail messages. Other types of integration of the present invention with other applications and/or devices for generating and/or receiving such content are also possible and could easily be implemented by one of ordinary skill in the art.

Capturing of the screen events may optionally and preferably be performed real-time. Analysis of the captured events may be performed either on-line or off-line. By "on-line", it is meant that the process of analyzing is performed while a connection is maintained the computational device of the user. By "off-line" it is meant that the process of analysis is performed after the data have been collected. The present invention is preferably operative in either mode, as the computational device of the user preferably operates a screen agent, which is capable of retaining data from the activities performed with regard to the environment of the computational device, and particularly those activities which are associated with at least one action occurring on the screen of the computational device. Thus, the act of analyzing screen events is not necessarily limited to a particular session with a customer service representative or other user of the computational device, but instead may optionally be performed on the captured data at any time.

The present invention is optionally and more preferably operative with regard to voice, screen and other types of data capture, and optionally most preferably also storage and retrieval of the captured data. Data may optionally be captured from any data source, including but not limited to, video data, audio data (including also voice communication data such as voice over IP (VoIP) data, streaming audio data and any other type of audio-related data), coded data, e-mail messages and/or attachments, chat and other types of messaging system messages, and user interface data.

The present invention is optionally implemented to be useful for customer relationship management (CRM), customer service representative quality measurement (QM) in call centers or contact centers, measurement or assessment of the quality, efficiency and/or suitability of software programs provided by application service providers (ASPs), and performance measurement of remote users.

A contact center operation and/or other types of customer service-dependent operations can benefit from the present invention in a number of ways, including the ability to record the screen behavior of its representatives and the ability to perform analysis on the recorded data, optionally and preferably to trigger certain activities, while maintaining a low bandwidth and low resource consumption. Of course, the present invention is operative with, and would also be useful for, any environment in which the actions of a human operator of a computational device should be analyzed or at least captured for optional storage and retrieval.

BRIEF DESCRIPTION OF THE DRAWINGS

The present invention will be understood and appreciated more fully from the following detailed description, taken in conjunction with the drawings in which.

DESCRIPTION OF THE PREFERRED EMBODIMENTS

Figure 1:
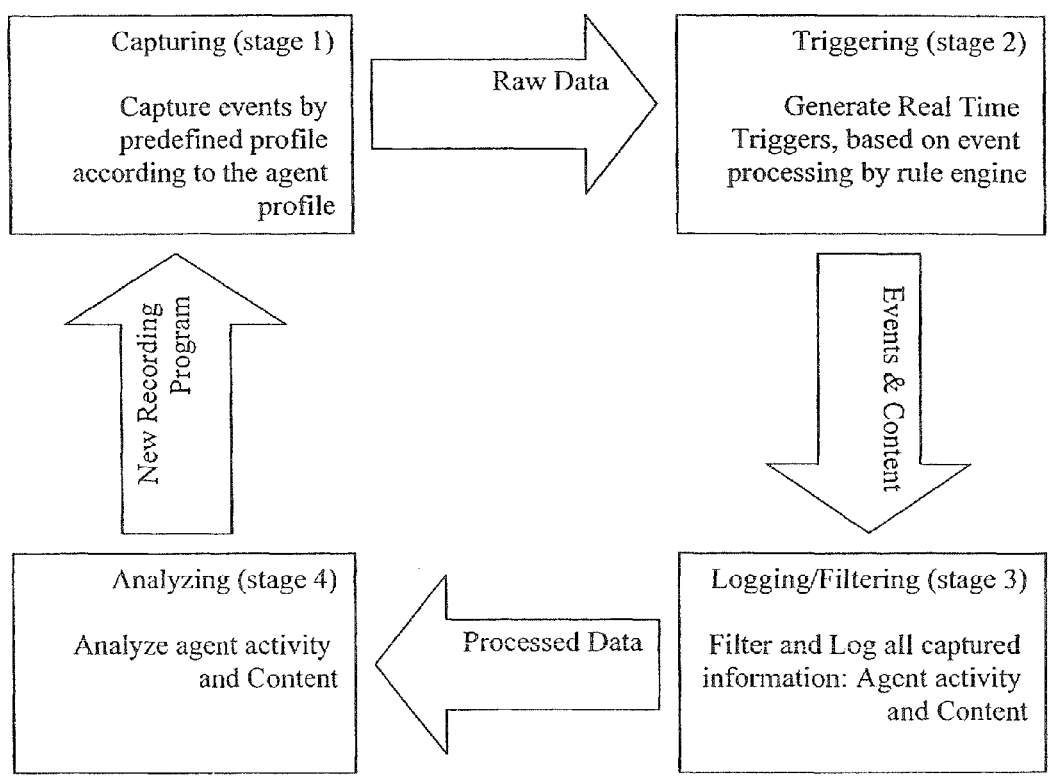
FIG. 1 shows an exemplary flow process for processing screen events according to the present invention.

The present invention is of a method for capturing screen events, and processing these events to form data in a data format which is susceptible to analysis. Preferably, the method also comprises analyzing the data in order to extract useful information about the user of the screen and computational device which generated these screen events. More preferably, the method of the present invention is able to assess the quality of the performance of the user whose interaction with the computational device caused the screen events to be generated.

Capturing of the screen events may optionally and preferably be performed real-time. Analysis of the captured events may be performed either on-line or off-line. By "on-line", it is meant that the process of analyzing is performed while a connection is maintained the computational device of the user. By "off-line" it is meant that the process of analysis is performed after the data have been collected. The present invention is preferably operative in either mode, as the computational device of the user preferably operates a screen agent, which is capable of retaining data from the activities performed with regard to the environment of the computational device, and particularly those activities which are associated with at least one action occurring on the screen of the computational device. Thus, the act of analyzing screen events is not necessarily limited to a particular session with a customer service representative or other user of the computational device, but instead may optionally be performed on the captured data at any time.

According to preferred embodiments of the present invention, the method is operative according to a number of different stages. The screen events are preferably first captured. It should be noted that the screen events may optionally be retained before capture, as previously described. The process of capturing the screen events preferably includes decomposing these events into one or more components, such that the captured screen events are preferably in a data format structure which is susceptible to further analysis. This process of decomposing the events may also optionally be described as parsing the captured events to form raw data.

Next, one or more triggers may optionally be activated, preferably according to one or more rules as determined by a rule engine. Next, the captured information is more preferably filtered. The filtered information is then most preferably logged (stored). This information may optionally and preferably be analyzed.

According to further preferred embodiments of the present invention, an event, or a pattern of events, may optionally serve as a trigger for the active extraction of data from a plurality of different locations on the screen and/or on the computational device, and/or the active extraction of data of a plurality of different types. For example, if a particular GUI (graphical user interface) gadget is activated, such as a particular GUI button being "clicked on" or otherwise selected by the user with a mouse or other pointing device, this preferred embodiment of the present invention enables data to be captured from multiple data sources, such as two separate windows on the screen, one window and an e-mail message, or any other combination of data from multiple sources. Thus, the present invention is optionally and preferably not limited to capturing one type and/or one source of data upon being triggered by a trigger.

According to preferred embodiments of the present invention, there is preferably provided a method for obtaining information about a plurality of applications being operated by a computational device, comprising: detecting at least one screen event of the computational device; determining if the at least one screen event is a triggering event; and if the at least one screen event is a triggering event, capturing data about the plurality of applications according to a plurality of different portions of a display of a screen of the computational device.

The principles and operation of the method according to the present invention may be better understood with reference to the drawings and the accompanying description. It should be noted that the present invention is described with regard to the operation of a contact center for a plurality of customer service representatives for the purposes of clarity only and without any intention of being limiting. In fact, the present invention is operative for capturing screen events and related information from any type of computational device which is being operated by a user.

As previously described, the present invention preferable features a number of stages for processing the screen events. These stages are described in greater detail below with regard to FIG. 1, which is a flow diagram of an exemplary method according to the present invention.

As shown, in stage 1, data is captured by observing at least one computational device environment event, and then retrieving at least a portion of the data generated by that event. The system of the present invention can optionally capture events related to activities performed in the computational device environment, including but not limited to, screen, keyboard and mouse type events, as previously described. More preferably, these events are captured through a component (screen agent software module) installed on the computational device of the user, as described in greater detail below with regard to FIG. 2. Preferred embodiments of the capturing process are described with regard to FIGS. 3A and 3B, below.

Optionally and more preferably, the system enables one or more selective criteria to be predefined for determining which activities to capture. The system is therefore able to reduce the actions being performed to a pattern of parameters, by analyzing these activities according to the one or more selective criteria for capturing data. This ability more preferably supports other preferred embodiments of the present invention, such as the creation of selective criteria for recording the screen activities for example.

Also optionally and more preferably, the system supports parsing of the raw data from the captured activities, and hence about the actions of the user, according to one or more specific criteria for each computational device and/or user, depending upon whether the criteria are determined according to hardware identifiers or user-related identifiers. Most preferably, each user has a profile of criteria for capturing data. Such a profile is preferably used as a pre-filtering process, in order to focus the collection of data on those screen events which are actually of interest.

The raw data (from the captured screen events) optionally and preferably passes to a rule engine for processing in stage 2 of FIG. 1 as shown. This stage may optionally be referred to as the "triggering" stage, as one or more specific events may optionally be predefined for generating real time triggering. Such triggers may optionally result in data capture for any type of event, and/or any other type of data capture. For example, the trigger could optionally be used to start recording the events occurring on the screen of the computational device of the user if the user performed a specific action, such as generating a new e-mail message or any other specific action. Such a recording would preferably effectively provide a complete chronological record of the alterations to the display of the screen of the computational device, which could optionally be played back like a "movie" of the screen display.

The identification of a particular trigger, and the invocation of a particular response, such as recording data related to activities performed by an agent, is preferably performed according to a rule engine. This engine preferably receives a plurality of rules, which may optionally be defined according to the operator of the system according to the present invention, and examines the incoming raw data in order to determine whether the data fits one or more of the rules. If a rule is found to fit the data, then preferably one or more actions are executed according to the rule, such that the data comprises a trigger.

Figure 2:
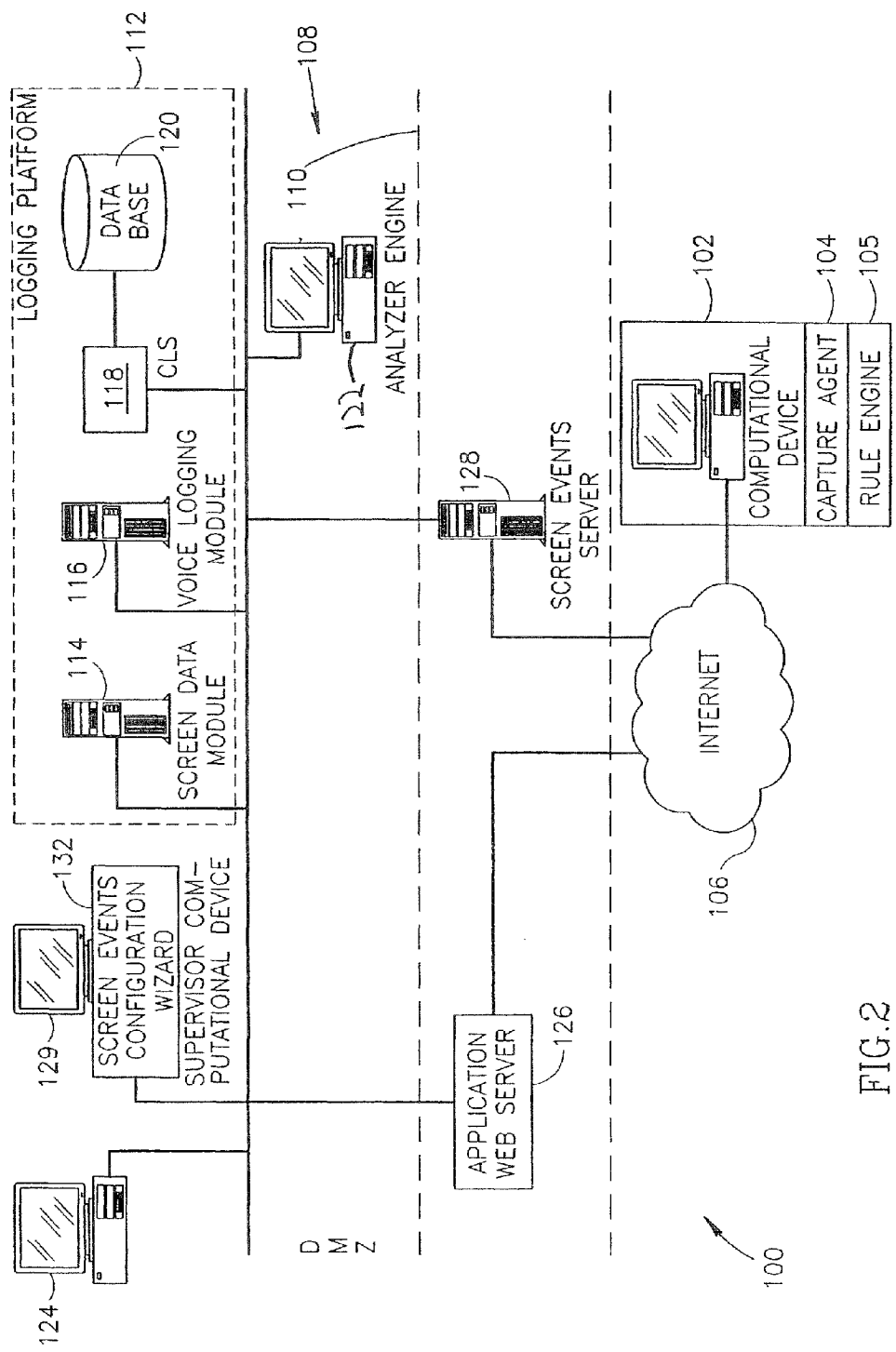
FIG. 2 shows an exemplary system according to the present invention for performing the flow process of FIG. 1.

The rule engine is more preferably operated as part of the screen event agent on each user computational device, but could alternatively be operated by a separate server (not shown; see FIG. 2). In any case, the rule engine could optionally be implemented as any type of rule processor, which could be easily implemented by one of ordinary skill in the art, as the operation of the rule engine is more preferably deterministic.

One exemplary implementation of the triggering process is described with regard to FIG. 4 below. According to the exemplary but preferred implementation shown, the triggering process preferably includes the analysis of one or more parameters which characterize the screen event. More preferably, the triggering process includes comparing a pattern of parameters which characterize the event to one or more rules by the rule engine, such that the event is determined to be a triggering event for one or more actions by the system of the present invention according to the pattern of parameters.

Once an action has been selected by the rule engine, the process preferably passes to the logging stage. More preferably, the event itself (as determined by the rule engine) and the content or data which triggered that event are both passed to the logging stage.

In the logging stage, the captured content or data is preferably at least stored. More preferably, the logging stage also includes a filtering process, for filtering the captured content or data. This filtering process may optionally and preferably be used in order to determine which information is saved and/or passed to a further stage in the process, and which is to be discarded. However, more preferably the captured content and/or data is parsed into a data format which is susceptible to further analysis. By "susceptible to analysis" it is meant that the data format provides a plurality of components or fields, each of which holds a particular value or type of data, such that the data structure of the format permits an automatic analysis to be performed on the data. Most preferably, each component or field represents a particular type of event which may occur in the computational environment of the user.

Optionally and more preferably, the parsed content and/or data forms parsed data which is maintained as a database of events such as mouse click, keyboard strokes, opened and closed windows, specific values in predefined locations/fields etc. Any type of event which occurs in the computational environment of the user may optionally be included in the database. Broadly, these events may be divided into two categories: active events, which are those induced or caused by the user, such as mouse clicks, the operation of the keyboard, voice activated commands and so forth; and passive events, such as windows opening and closing, information or data received from an interaction with a customer (such as chat text, or an e-mail or instant messaging system message, for example) and changes to the screen display which are not directly caused by an action of the user.

Next, the processed data is passed to an analysis stage. In this stage, the previously captured events, optionally with any associated data, are analyzed in order to determine one or more different types of information about the captured events. These different types of information preferably characterize the captured events according to one or more characteristics, such that the events are preferably characterized according to a pattern of parameters, although the analysis may optionally be performed according to an analysis of at least one value of at least one parameter.

The system can preferably perform analysis of the events captured and logged to establish various goals, more preferably regarding the performance of the user of this computational device. For example, the efficiency of interactions with the customer may optionally be ascertained. Efficiency may optionally be defined according to such parameters as the ability to operate the customer support software, amount of "backtracking" or repetitive actions required to accomplish a particular task, number of contacts handled and their length, relative complexity of the interaction with the customer which is required, and so forth. These goals may optionally be used to evaluate the user of the computational device.

Other types of analyses may also optionally be performed, alternatively or additionally. In any case, the process of analysis preferably includes sending an automatic notification of one or more analyzed features of the performance of the user of the computational device to a supervisor, for example. This type of selective notification is preferred, as it may assist the supervisor to better manage the performance of the individual users.

Since this method of capture requires fewer resources for network management and storage, the system optionally and preferably supports continuous recording of events and data. The continuous recording generates chronological information about the user as an individual and about the group of users. The availability of chronological information enables the system to base its recommendations for evaluation from a wider point of view in addition to unusual situations or other criteria.

Another optional goal is to perform a more complex analysis, for example on the collective information gathered from all user activities or certain groups (e.g. new users, trainees etc.) to improve the overall performance of the contact center or other group of users. For example, certain processes required from the user may create unnecessary complexity in the operation of the systems, which may be alleviated by redesign of the screens or the process. This type of recommendation may further increase the efficiency of the interaction of the user with the computational environment.

Yet another optional goal is content analysis, which in this example is analysis of the content associated with a particular event. Non-limiting examples of contact data include e-mail content, user remarks, user summaries or reports of an interaction and so forth. Based on this information, the system can optionally perform content analysis for any purposes e.g. detect market trends or special needs/problems, which corresponds to the market sector.

FIG. 2 shows an exemplary system according to the present invention for performing the screen event capturing method, with optional further processes such as analysis for example, as previously described with regard to FIG. 1. As shown, a system 100 features a computational device 102 for being operated by a user (not shown). Computational device 102 preferably operates a capture agent 104, which may optionally be implemented as an agent which operates according to the HTTP (HyperText Transfer Protocol) protocol, although of course alternatively any other type of suitable communication protocol could optionally be used. Computational device 102 also preferably operates the software system of the organization (not shown), for which the performance of the user of computational device 102 is being measured.

Capture agent 104 preferably captures the screen events performed by computational device 102. As previously described, the process of capturing screen events is optionally and more preferably divided into two processes: retaining the data of the screen events as performed by computational device 102; and capturing the screen events. The process of analysis may optionally be performed "off-line", after the event has occurred or even after the session with the user of computational device 102 has ended, for example in order to avoid degradation of the performance of computational device 102.

Capture agent 104 optionally and most preferably features a rule engine 105, which is most preferably also operated by computational device 102. Rule engine 105, as previously described, preferably determines whether one or more captured screen events fulfill a predefined trigger, such that one or more further actions should preferably be performed with the captured screen event. Capture agent 104 preferably detects user actions (passive and active), while rule engine 105 preferably filters the user actions according to predefined events. The filter event file may optionally be defined by another application, such as a screen events configuration wizard 132, shown at a supervisor computational device 129 and described in greater detail below.

The operation of capturing event 104 and rule engine 105 are described in further detail with regard to FIGS. 3A, 3B and 4, below. It should be noted that optionally, one or both of capturing event 104 and rule engine 105 could optionally be located at, and operated by, a server located remotely to computational device 102 (not shown).

Optionally and preferably, rule engine 105 is a deterministic software program which operates according to a set of pre-defined rules, which may optionally be business rules for example.

Computational device 102 may optionally be connected to a network such as Internet 106 or alternatively may be connected to any other type of network. In any case, computational device 102 is preferably in communication with an organizational LAN (local area network) 108, but optionally and more preferably is outside a firewall 110 as shown. Firewall 110 protects organizational LAN 108 and hence the other elements connected to organizational LAN 108.

Computational device 102 preferably communicates with a logging platform 112 through organizational LAN 108. Logging platform 112 may optionally be implemented from one or more "off the shelf" products. Logging platform 112 preferably includes a screen data module 114, such as the ScreenLogger™ product (Nice Systems Ltd., Ra'anana, Israel) for example; a voice logging module 116, such as the NiceLog™ product (Nice Systems Ltd., Ra'anana, Israel) for example; and a CLS scheduler 118. Screen data module 114 preferably receives a chronological series of displays of the screen of computational device 102 from capture agent 104, for example as the previously described optional "movie" of screen displays as shown by computational device 102.

CLS scheduler 118 optionally provides an interface for call management, for example in order to be able to analyze a call for one or more parameters. CLS scheduler 118 also optionally and more preferably provides a user interface (not shown) for a supervisor or other user to be able to retrieve information from database 120.

Captured data is preferably stored in a database 120, associated with logging platform 112 as shown. Database 120 preferably stores the entire data, more preferably including both content and events. The structure of database 120 preferably enables third party applications as well as local applications (such as CLS scheduler 118 for example) to access the data and process it.

According to optional but preferred embodiments of the present invention, a screen events server 128 is preferably located in the DMZ, for performing the filtering and/or logging processes according to the present invention, as described for example with regard to stage 3 of FIG. 2. Screen events server 128 more preferably has one or more of the following functions: centralizing all connections from capture agents 104; storing the received information in a database and/or sending it to logging platform 112; performing some logic rules on the data; and also optionally for receiving data in a firewall environment, in order to prevent direct access to organizational LAN 108.

According to preferred embodiments of the present invention, screen events server 128 performs a type of pre-analysis through the performance of the filtering processes. More preferably, screen events server 128 may optionally determine which screen events and/or associated content should be logged, or stored in database 120. For example, a particular trigger may be performed at computational device 102, such as activating a software program for playing a game, and/or causing the Web browser (not shown) to download a Web page which is not specified as being part of an approved list of such pages or sites, which in turn is measured by screen events server 128 for such metadata as the number of times the trigger is performed, length of time between performances, and length of time each action related to the trigger is performed (for example, playing a game through a game software program).

The metadata may optionally be gathered by screen events server 128 for one event, or a pattern of such events. For example, the user of computational device 102 may optionally be required to perform a series of actions after a session with a customer (for customer-related applications), in a process known as "closure". Screen events server 128 could optionally measure the period of time required for closure, and/or also collect other information related to closure, according to the pattern of events.

The analysis of the collected information and/or metadata is preferably driven by an analyzer engine 122, which is one example of a local application that may access the data from database 120. Analyzer engine 122 is more preferably a stand-alone application, which reads the data, most preferably including both events and content, and performs logic actions on this data. Preferred functions of analyzer engine 122 include but are not limited to, performing data mining on the user event data in order to assess the behavior of the user at computational device 102. Such an analysis may optionally and more preferably support an evaluation of the user as an individual and/or enable conclusions about the organization to be made, for example.

Analyzer engine 122 also preferably enables content analysis to be performed on the content data in order to detect common problems, market trends, new ideas etc. The operation of analyzer engine 122 performs the process described with regard to stage 4 of FIG. 1.

Analyzer engine 122 can also optionally generate reports or communicate with other components of logging platform 112 in order to change the recording schedule according to predefined criteria.

According to optional but preferred embodiments of the present invention, a local computational device 124 for a local user (local customer service representative) may optionally reside on organizational LAN 108, within firewall 110. Local computational device 124 also preferably operates capture agent 104 and rule engine 105, as previously described (not shown).

An application Web server 126 is optionally and preferably located in a DMZ (demilitarized zone) between Internet 106 and organizational LAN 108. Application Web server 126 may optionally be implemented as any Web Server over Internet 106 and/or or organizational LAN 108, and more preferably provides a GUI (graphical user interface) for retrieving and displaying data from database 120, for example by a supervisor computational device 129.

Screen events configuration wizard 132 is an application that enables the user to define which events are to be captured by capture agent 104. Screen events configuration wizard 132 assists the user of supervisor computational device 129 to create a filter on the massive amount of events that capture agent 104 can optionally provide. The user preferably operates screen events configuration wizard 132 by operating the organization software system, which should preferably be at least similar to the system operated by computational device 104, more preferably such that one or more function calls and/or other functions are similar or identical. While operating the organization software system, screen events configuration wizard 132 preferably enables the user to select "objects" on the screen of supervisor computational device 129, for example by pointing at each object. The user may then optionally and more preferably attach an action or a value to each object, thereby defining the events to be collected by capture agent 104 (more preferably through filtering by rule engine 105).

According to optional but preferred embodiments of the present invention, the user can first define events to capture. The user preferably defines a set of events to capture through screen events configuration wizard 132. For example, a rule could optionally state: "detect if the user searched for the word NICE in Nasdaq.com site; trigger start screen recording if the event is detected; trigger stop recording if the user exits the Nasdaq.com site".

As an example of actual event capturing, the user of computational device 102 preferably operates the software system of the organization. Capture agent 104 preferably captures all predefined events and sends them to screen events server 128, which optionally sends them to database 120, preferably after performing a filtering process. While the user is working, assume that the Web browser of computational device 102 (not shown) is being operated, and that the user enters the word NICE while the Web browser is displaying the Nasdaq.com Web site. Capture agent 104 preferably detects this event, more preferably according to rule engine 105, and sends a trigger to screen events server 128.

For triggering by an event, screen events server 128 preferably sends a screen-recording request to logging platform 112 to record the behavior of the user according to the trigger source. The recording request is sent in real time after the event is detected.

Analyzer engine 122 preferably retrieves all of the screen events and associated content (if any), which screen events server 128 stores in database 120. These events represent the actions of the user while the user is working with the organization software system. Analyzer engine 122 is able to assess the performance of the user. The controlling operator of analyzer engine 122, such as a supervisor for example, can optionally predefine reports to see the results.

According to further preferred embodiments of the present invention, the analysis performed by analyzer engine 122 and/or some other component of the system according to the present invention enables automatic quality management and assessment to be performed.

The automatic QM (quality management) system of analyzer engine 122 according to the present invention should help the supervisor to do more than simply enter information into forms, but rather should actually perform at least part of the evaluation automatically. Optionally, a manual score from the supervisor may also optionally be added to the automatic score. There may also optionally be a weighting configured, in order to assign different weights to the automatic and manual assessments.

When the accuracy of the automatic QM scores reaches a relatively high level, for example after the analysis application has been adjustably configured for a particular business, the new system may optionally at least reduce significantly the human resources for quality management. Therefore, analyzer engine 122 more preferably automatically analyzes the quality of the performance of the user of computational device 102, optionally and most preferably according to one or more business rules. As previously described, such analysis may optionally include statistical analyses, such as the number of times a "backspace" key is pressed for example; the period of time required to perform a particular business process and/or other software system related process, such as closure for example; and any other type of analysis of the screen events and/or associated content. Statistical analysis may also optionally be performed with regard to the raw data.

Figure 3A:
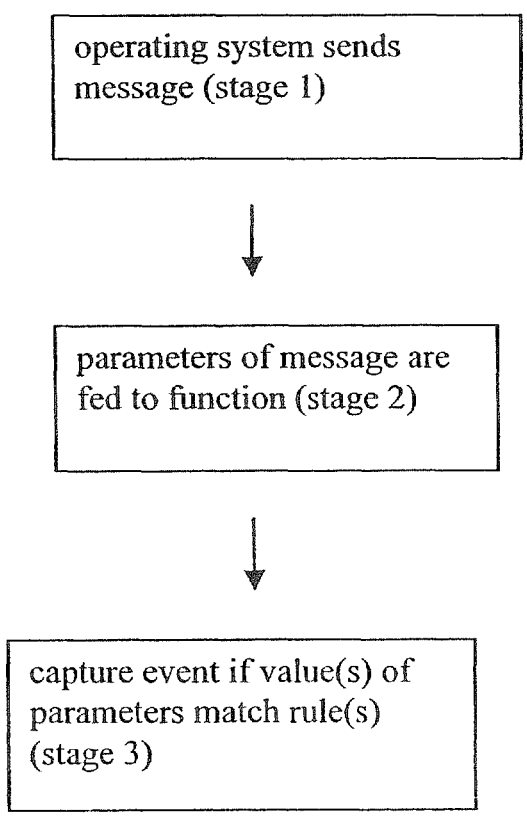
FIGS. 3A and 3B are flowcharts of exemplary methods according to the present invention for message and event driven capture, respectively.
Figure 3B:
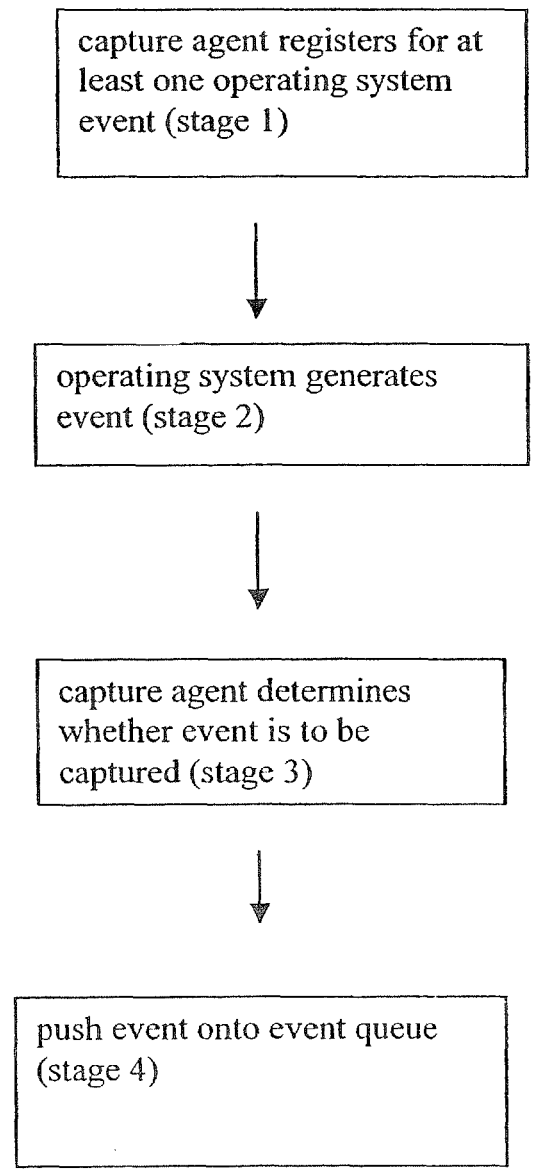

FIGS. 3A and 3B show an exemplary method for capturing screen events according to one or more messages (FIG. 3A) or a characterized system event (FIG. 3B).

Screen events are preferably captured according to messages for keyboard-related events and mouse or other pointing device-related events, particularly for operating systems which rely on messages for communication between these types of peripheral user input devices and the CPU. It should be noted that for the purposes of the present invention, a touch-sensitive screen may optionally be regarded as a pointing or user input device. As shown with regard to FIG. 3A, a method for capturing events according to messages from a mouse is described as a nonlimiting, illustrative example only.

In stage 1 of FIG. 3A, the operating system sends a message as a result of an action by a mouse. The parameters of this message are preferably fed to a call back function according to the present invention in stage 2, which in this illustrative example is constructed according to the Win32 API (application programming interface) for the Windows™ operating system (Microsoft Corp., USA) as follows:

MouseProc (int Ncode, WPARAM wParam, LPARAM lParam)

This function receives parameters whose values are constants for the Windows™ operating system. This function is located at the capture agent, for example, as previously described. The values of the parameters are preferably used to determine whether the screen event should be captured. If the value of one or more parameters matches at least one rule for capturing the event, as determined in stage 3, then the event is preferably captured. Otherwise, the event is preferably discarded.

It should be noted that one preferred feature of message-driven capture of screen events is that the messages are preferably sent continuously by the operating system, and are then optionally and more preferably filtered by the present invention, in order to determine which screen events related to these messages should be captured.

FIG. 3B, on the other hand, shows an exemplary, illustrative method for capturing screen events which is event driven, according to one or more operating system events. One example of an event-driven screen event is an event which occurs in a window of the Windows™ operating system, as displayed by the computational device of the user. As shown, in stage 1, the present invention registers for at least one operating system event with the operating system. For example, preferably the capture agent being operated by the user computational device registers for the operating system event.

In stage 2, the operating system generates an event, which is preferably associated with one or more parameters. In stage 3, the capture agent (or other capturing function according to the present invention) preferably determines whether the event is to be captured, more preferably according to the one or more parameters. For example, for an event which is related to a window, optionally and preferably the parameters include creating a new window, changing the focus from one window to another (ie, changing the active window on the screen), destroying a window, changing the location of a window, and so forth. For this example, events may optionally be regarded as the combination of a set of messages.

In stage 4, once an event has been selected for capture, it is preferably pushed onto an event queue. The operation of the present invention with regard to events on this queue is described with regard to FIG. 5.

Of course, these examples could optionally be constructed and performed according to any operating system for a computational device by one of ordinary skill in the art.

Figure 4:
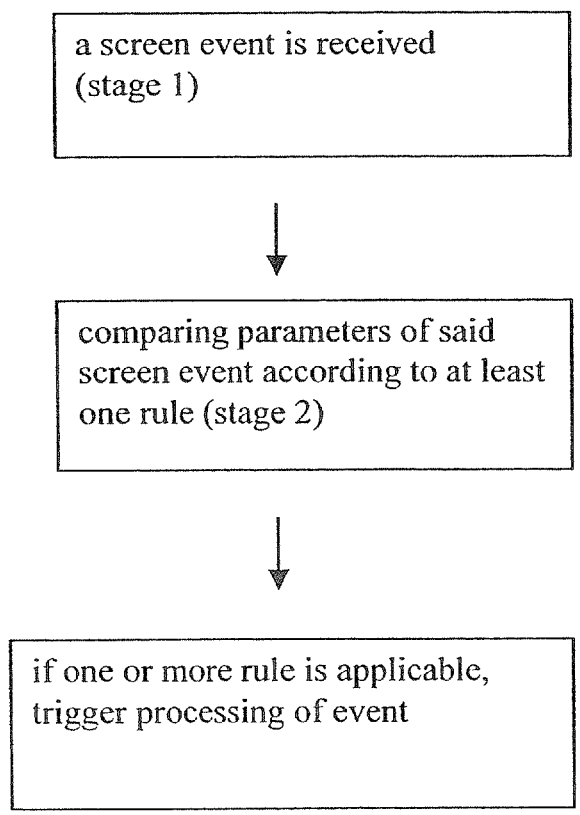
FIG. 4 shows a flowchart of an exemplary method for performing the triggering process according to the present invention.

FIG. 4 is a flowchart for describing an exemplary method for detecting a trigger according to the present invention, as preferably performed by the capture agent and rule engine of the system according to the present invention (shown in FIG. 2) and also preferably for performing stage 2 of FIG. 1.

As shown, in stage 1, a screen event is received, which is preferably characterized by a set of one or more parameters. These parameters more preferably uniquely characterize the screen event, which is the reason that a plurality of parameters is preferred. The screen event is preferably received from the queue of such events, previously described with regard to FIG. 3B.

In stage 2, these parameters are compared to one or more rules, preferably by a rule engine as previously described. The comparison is therefore more preferably of a pattern of parameters, such that each event is characterized by the pattern. In stage 3, if one or more rules are found to be applicable to the event, then it preferably triggers the further processing of the captured data, optionally with associated content, as previously described.

Figure 5:
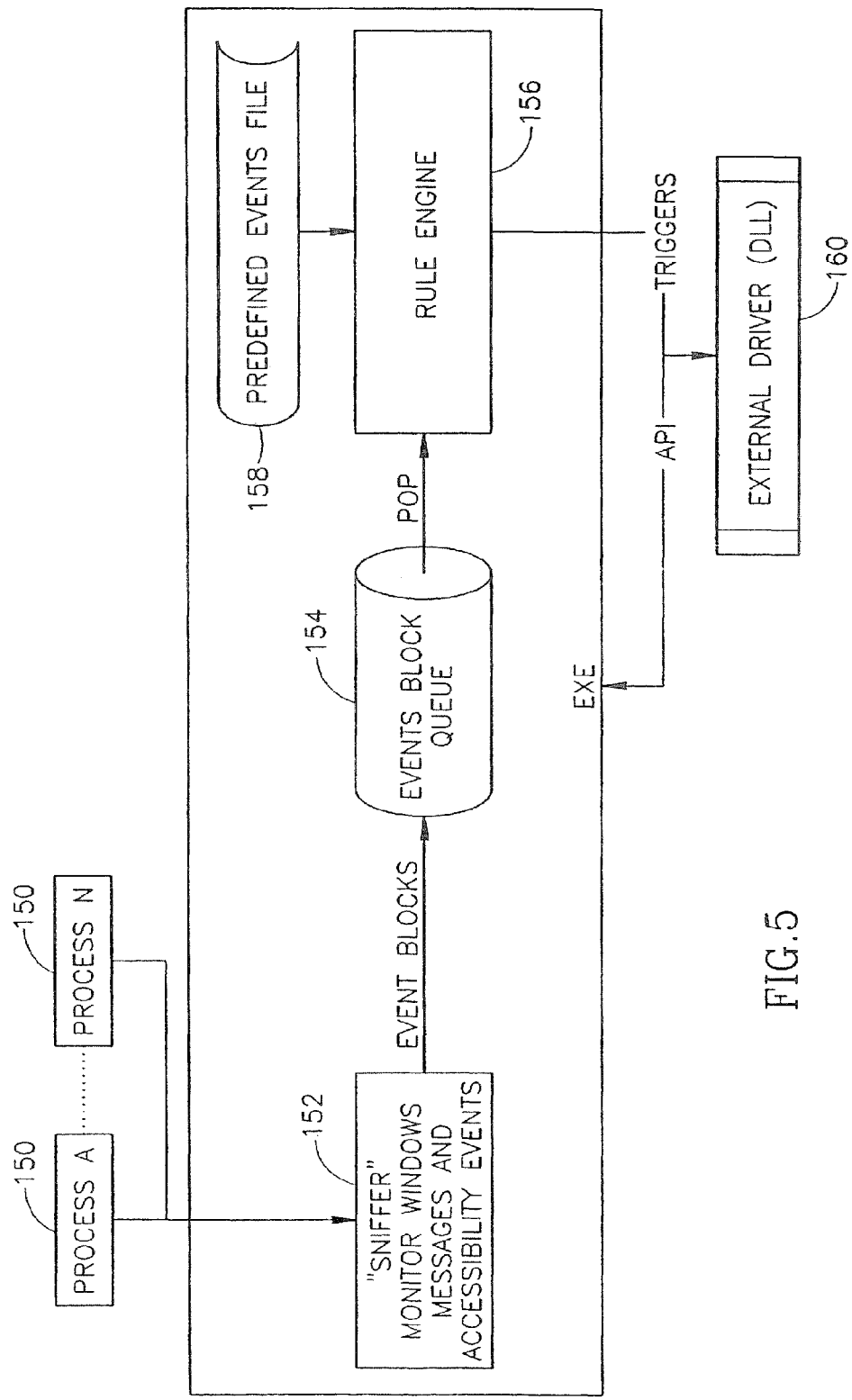
FIG. 5 describes an exemplary system and flow process for performing triggering according to the present invention.

FIG. 5 shows an exemplary but preferred flow of operations for the capture agent and rule engine of the present invention.

As shown, the user computational device performs a plurality of processes 150, for example in order to permit the user to operate the organizational software system. A sniffer module 152 optionally and preferably monitors processes 150; more preferably, sniffer module 152 is operated by the computational device of the user (not shown). As previously described with regard to FIGS. 3A and 3B, sniffer module 152 monitors messages and/or events generated by the operating system. Screen events are then preferably sent to an event queue 154 as shown.

Rule engine 156 preferably removes each screen event in its turn from event queue 154, and compares the screen event to one or more rules. Optionally and more preferably, the rule(s) are obtained from a predefined events file 158. If rule engine 156 detects one or more triggers, then the event is preferably sent out from the user computational device, for example through an external driver 160

While the invention has been described with respect to a limited number of embodiments, it will be appreciated that many variations, modifications and other applications of the invention may be made.

What is claimed is:

1. A computer-implemented method for assessing the quality of performance of a customer service representative engaged in a customer-representative interaction-related session, the method comprising:
   capturing at least one screen event of a computational device associated with the customer service representative to form a captured event, wherein the screen event is a graphical user interface (GUI) element shown on a screen coupled to the computational device;
   parsing said captured event according to one or more criteria to obtain screen event data that contains text in a format which is susceptible to further analysis;
   triggering recording of screen data associated with the computational device, if said screen event data matches a user defined text search criterion; and
   performing computer-based automated quality measurement analysis based on the screen event data to assess the quality of performance of the customer service representative.

2. The method of claim 1, comprising:
   triggering recording of audio data of the customer-representative interaction-related session, if said screen event data matches a specific criterion.

3. The method of claim 1, wherein performing the quality measurement comprises performing a statistical analysis of said screen event data.

4. The method of claim 1, wherein said at least one screen event is message-driven and said capturing comprises:
   receiving from an operating system of the computational device a plurality of messages about actions of the customer service representative on the computational device; and
   if at least one of the messages matches at least one capturing rule, capturing a screen event associated with said at least one message.

5. The method of claim 4, wherein the actions are performed using least one user input device.

6. The method of claim 5, wherein said at least one user input device includes at least one of a pointing device, a keyboard and a touch-sensitive screen.

7. The method of claim 1, wherein said at least one screen event is event-driven and capturing comprises:
   receiving a plurality of operating-system events from an operating system of the computational device;
   determining at least one parameter for characterizing at least one of said operating-system events; and
   if said at least one parameter matches at least one capturing rule, capturing said at least one screen event.

8. The method of claim 7, wherein said at least one screen event is related to a window of the operating system.

9. The method of claim 1, wherein capturing said at least one screen event further comprises:
   retaining data related to said at least one screen event; and
   capturing said at least one screen event from said retained data.

10. The method of claim 1, wherein comprises:
    filtering said at least one captured event according to at least one filter for obtaining metadata about said at least one captured event.

11. The method of claim 1, wherein said at least one captured event is an active event selected from a keyboard event, a mouse event a user activated screen event, or a combination thereof.

12. The method of claim 1, wherein said at least one captured event is a passive event which is not activated by the customer service representative.

13. The method of claim 1 comprises:
    capturing additional data having content associated with said captured event, and wherein said analysis includes analyzing said content.

14. The method of claim 1, comprising triggering recording according to predetermined rules, wherein the rules are defined by:
    receiving objects selected by a user, the objects being selected on a screen of a supervisor computational device by pointing at the objects on the screen; and
    enabling a user to attach a value to each of the objects.

* * * * *